United States Patent Office 3,402,133
Patented Sept. 17, 1968

3,402,133
FOAM PLASTICS AND PROCESS
FOR MAKING THEM
Alfred Kühlkamp, Hofheim, Taunus, and Rudolf Nowack, Frankfurt am Main, Germany, assignors to Farbwerke Hoechst Aktiengesellschaft vormals Meister Lucius & Brüning, Frankufurt am Main, Germany, a corporation of Germany
No Drawing. Filed May 11, 1965, Ser. No. 454,981
Claims priority, application Germany, May 26, 1964,
F 42,989
17 Claims. (Cl. 260—2.5)

ABSTRACT OF THE DISCLOSURE

There is disclosed herein a porous foamed plastic composition, and a method for making such a composition, which comprises the reaction product formed at about room temperature without the addition of heat from approximately equivalent amounts of (1) a short-chain reactive polymer having a molecular weight of about 2000 and having an acidic hydrogen atom on a carbon atom immediately adjacent a carboxyl group or a nitrilo group, (2) a carbamate reaction product of carbon dioxide and a primary or a secondary polyamine, and (3) an aldehyde.

---

The present invention relates to foam plastics and a process for making them.

Foam plastics have been used as insulating materials in building and heat engineering and for damping mechanical vibrations.

The present invention provides a process for the manufacture of foam plastics wherein telomers, i.e. short-chain polymers, containing CH-acid radicals and having a low softening point are treated with an aldehyde and a reaction product of a polyamine and $CO_2$ in a process corresponding to aminoalkylation.

Reaction products of amines with carbon dioxide have already been described in the literature (cf. "The Chemical Structure of Some Diamine Carbamates," J.A.C.S., 73, 1829 (1951)).

The process of the invention has the advantage over known processes for the manufacture of foam plastics from polyesters and the like that the $CO_2$ serving as expanding agent is not produced by reacting highly reactive isocyanates with water but by splitting it off from the above mentioned reaction product of $CO_2$.

The isocyanates used for making polyurethane foam plastics are very sensitive to water. It is possible to add exactly measured quantities of water to the batch of foam plastic. However, in that case it is desired to obtain a determined chemical reaction, for example, liberation of $CO_2$ and formation of urea bridges. If, however, the batch of foam plastic comes in contact with water from the outside, for example, when foaming is carried out in situ on wet walls, undesired side reactions occur. Furthermore, deprivation of moisture by the isocyanate would impede the setting of fresh mortar or concrete and cause damage to the constructional elements.

In contradistinction thereto, the process of the invention is insensitive to water and water is even set free in the course of the reaction. Unset mortar and concrete which are foamed by the process of the invention set in an unobjectionable manner.

As telomers containing CH-acid groups there may be used, for example, copolymers of a variety of monomers with allyl esters or vinyl esters of β-keto-carboxylic acids, or with other unsaturated polymerizable dicarbonyl compounds or unsaturated polymerizable compounds containing hydrogen atoms which have been activated by electron-attracting groups such as the carbonyl or nitrile group, at the carbon atom. Particularly suitable are the allyl and vinyl esters of acetoacetic acid, and unsaturated malonic acid derivatives, that is compounds that yield telomer copolymers with a variety of monomers.

It is, in principle, also possible to use unsaturated derivatives of other acids as substances carrying the active hydrogen in the telomer. There may be mentioned, for example, the following:

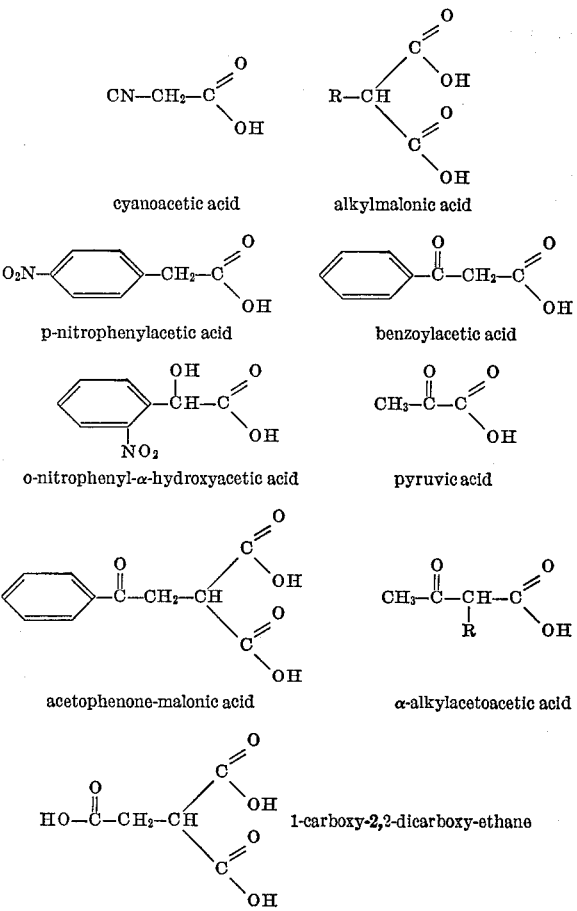

Suitable monomers capable of forming above telomers with the allyl and vinyl esters are, for example, vinyl esters such as vinyl acetate, styrene, acrylic acid esters such as methylacrylate, methacrylic acid esters such as methylmethacrylate, ethylene and vinyl chloride.

As telomers containing CH-acid groups there may advantageously be used those having a low molecular weight, which are in the liquid or semi-solid state of aggregation at room temperature and can therefore easily be processed. For example, a telomer composed of vinyl acetate and acetoacetic acid allyl ester in a molar ratio of 1:1, having an average molecular weight of about 2000 is still viscous at room temperature.

As aldehyde for the aminoalkylation, formaldehyde may advantageously be used. Other aldehydes, particularly in combination with formaldehyde, may, however, also be used, for example, acetaldehyde or crotonaldehyde together with formaldehyde or alone.

In the reaction of the invention, at least the stoichiometric quantity of aldehyde equivalent to one acid hydrogen per group is used. If, for example, primary amines and/or CH-acid compounds with two active hydrogen atoms are used, the reaction may be proceed further and require more aldehyde.

The properties of the products obtained by the process of the invention may therefore be varied within wide limits. With an increasing degree of reaction of aldehyde, the degree of crosslinking of the product obtained by the process of the invention increases.

The course of the reaction appears to be, and may be illustrated, for example, as follows:

Telomer Chain

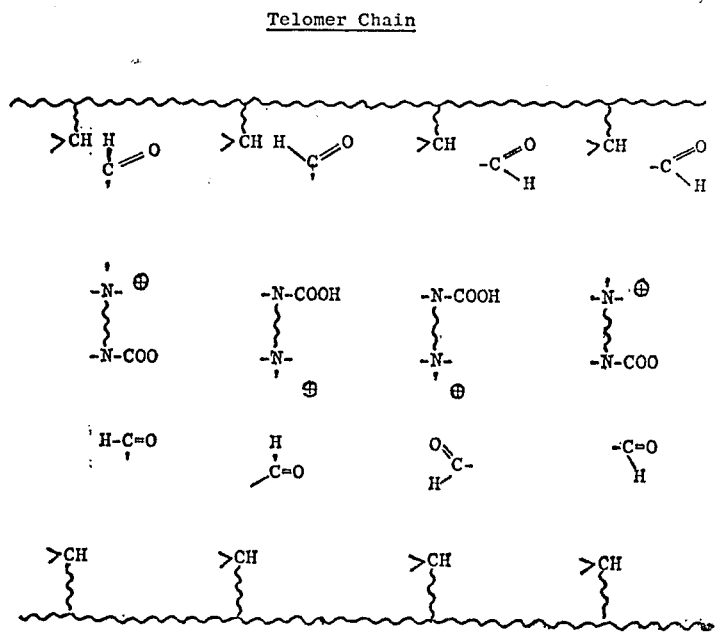

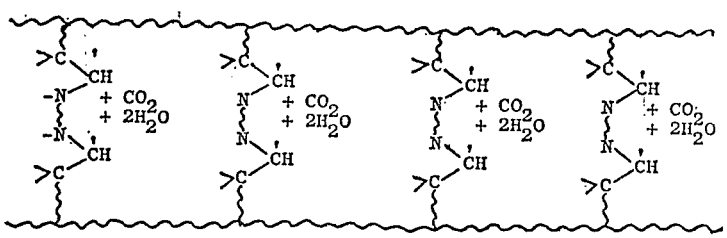

Telomer Chain

The aldehyde obviously reacts with the polyamine-$CO_2$ reaction product with liberation of the $CO_2$ and simultaneous linkage with the CH-acid group while splitting off water in a process corresponding to aminoalkylation. It is essential that the formation of $CO_2$ and the condensation take place substantially simultaneously. This is a great advantage in the manufacture of foam plastics: if the speed of the condensation reaction is slow, the expanding gas is also evolved slowly; if, however, the speed of condensation is high and the initially liquid product solidifies rapidly, the total amount of expanding gas is available in this short time and uniform foaming is ensured in the same manner as in a slow reaction.

In general, no further expanding agent need be added. Nor is it in general necessary to supply heat since the reaction proceeds at a sufficient speed at room temperature. It may, however, be advantageous in special cases to use a low boiling compound, which is vaporized during the reaction, as an additional expanding agent, for example, liquefied halogen-substituted alkanes. For this purpose, inert low boiling solvents which can be homogeneously distributed in the reaction mixture and are difficultly soluble or insoluble in the reaction product, may be used.

As aldehyde, formaldehyde may advantageously be used. It is also possible, however, to use higher aldehydes such as acetaldehyde and crotonaldehyde.

Amine-$CO_2$ reaction products suitable for use in the process of the invention are, for example, those obtained from di- or poly-amines with primary or secondary amino groups which can be reacted with $CO_2$ to yield the corresponding carbamates. Examples of such compounds are ethylenediamine, 1,3 - propylenediamine, 1,2 - propylenediamine, 1,4 - butylenediamine, 1,3 - butylenediamine, 1,6 - hexamethylenediamine, piperazine, C-substituted piperazines and ethylene - glycol - bis - $\gamma$ - aminopropyl ether.

To obtain uniform foams with a predetermined pore density, it is advantageous to add a small amount of a surface active substance. Exemplary of such surface active substances are polysiloxanes, block copolymers of polysiloxanes with polyethylene oxides, oxalkylated phenols, oxalkylated alcohols, oxalkylated fatty acids, fat alcohol sulfates, alkyl sulfonates, aryl sulfonates and block condensation products of polyethylene oxide and polypropylene oxide.

The following examples serve to illustrate the invention but they are not intended to limit it thereto, the parts being by weight.

Example 1

10 parts of a telomer of vinyl acetate, vinyl isobutyrate and acetoacetic acid allyl ester in a weight ratio of 20:20:60 were stirred with 0.3 part of a block copolymer of polysiloxane with polyethylene oxide as surface active substance and 2.74 parts of the reaction product of piperazine and carbon dioxide. Into the viscous mixture so obtained 2.52 parts of a 50% solution of formaldehyde in methanol were introduced uniformly. Stirring was continued until homogeneity was complete. The creamy product was then poured into a foaming vessel. After a few minutes foaming was terminated with liberation of CO₂.

The perfectly white foam had fine to medium-sized pores and a density of 0.05. After a few hours it had reached its final strength.

Example 2

28.4 parts of a telomer of vinyl acetate and acetoacetic acid allyl ester in a weight ratio of 1:1, having an average molecular weight of 1870, were thoroughly mixed with 0.6 part of a block condensation product of polyethylene oxide and polypropylene oxide as surface active substance and 5.65 parts of the reaction product of diethylene triamine and carbon dioxide. Into the viscous mixture so obtained, 6 parts of a 50% solution of formaldehyde in methanol were introduced rapidly while stirring. After a short time formation of CO₂ set in and after a few minutes formation of the foam plastic was terminated. After a few hours, the product possessed its final strength.

A very tough, rigid, light yellow foam plastic of a unit weight of 36 grams per liter was obtained.

We claim:

1. A porous foamed plastic composition which comprises the reaction product, formed at about room temperature without the addition of a substantial amount of external heat, of (1) about one equivalent of a short-chain reactive addition polymer of an unsaturated monomer having a molecular weight of about 2000 and having an acidic hydrogen atom on a cabon atom immediately adjacent a carboxyl group or a nitrilo group in said polymer, (2) about one equivalent of a carbamate that is the reaction product of a primary or a secondary polyamine and carbon dioxide and (3) an aldehyde, said aldehyde being used in a quantity such that the stoichiometric amount of aldehyde groups is at least about equivalent to the stoichiometric amount of said acidic hydrogen atoms.

2. A porous foamed plastic composition according to claim 1 wherein said aldehyde is a lower aliphatic aldehyde.

3. A porous foamed plastic composition according to claim 1 wherein said aldehyde is formaldehyde.

4. A porous foamed plastic composition according to claim 1 wherein said polyamine of said carbamate is an alkylenepolyamine of up to about 6 carbon atoms, an alkylene-bis-aminoalkoxy ether of up to about 4 carbon atoms in said alkylene and in said aminoalkoxy groups, a piperazine, or a salt thereof.

5. A porous foamed plastic composition according to claim 1 wherein said polyamine of said carbamate is an ethylenediamine, a propylenediamine, a butylenediamine, a hexamethylenediamine, an ethylene-glycol-bis-aminopropyl ether, piperazine, or an acetate salt thereof.

6. A porous foamed plastic composition according to claim 1 wherein said reactive addition polymer (1) is a copolymer of (a) a vinyl ester or an allyl ester of an acid of the formula

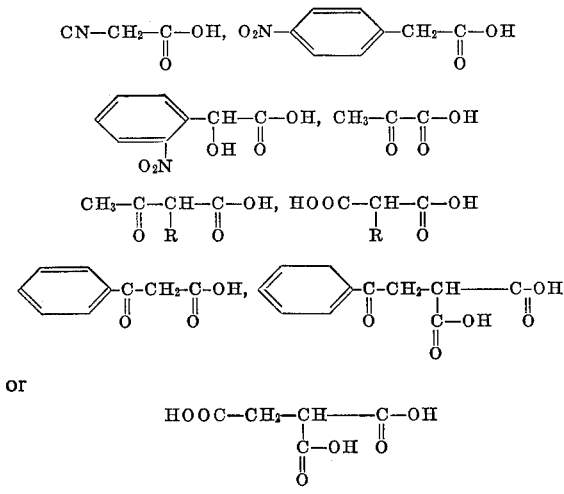

wherein R is a hydrogen atom or a lower alkyl group, and (b) vinyl acetate, vinyl isobutyrate, styrene, methyl acrylate, methylmethacrylate, ethylene, or vinyl chloride.

7. A porous foamed plastic composition according to claim 1 wherein said reactive addition polymer (1) is a copolymer of vinyl acetate and allyl acetoacetate.

8. A porous foamed plastic composition which comprises the reaction product, formed at about room temperature without the addition of a substantial amount of external heat, of about equivalent amounts of (1) a lower aliphatic aldehyde, (2) a reaction product of carbon dioxide with an aliphatic or a cycloaliphatic primary or secondary polyamine, and (3) a copolymer having a molecular weight of about 2000 of (a) a vinyl ester or an allyl ester of acetoacetic acid, a lower alkyl-acetoacetic acid, cyanoacetic acid, benzoylacetic acid, malonic acid or a lower alkyl-malonic acid and (b) a polymerizable monoolefinic compound.

9. A porous foamed plastic composition according to claim 8 wherein said polymerizable mono-olefinic compound is vinyl acetate, vinyl isobutyrate, styrene, methyl acrylate, methylmethacrylate, ethylene or vinyl chloride.

10. A process for the preparation of a porous foamed plastic composition which comprises reacting, at about room temperature without the addition of a substantial amount of external heat, (1) about one equivalent of a short-chain reactive addition polymer of an unsaturated monomer having a molecular weight of about 2000 and having an acidic hydrogen atom on a carbon atom immediately adjacent a carboxyl group or a nitrilo group in said polymer, (2) about one equivalent of a carbamate that is the reaction product of a primary or a secondary polyamine and carbon dioxide, and (3) an aldehyde, said aldehyde being used in a quantity such that the stoichiometric amount of aldehyde groups is at least about equivalent to the stoichiometric amount of said acidic hydrogen atoms.

11. A process for the preparation of a porous foamed plastic composition according to claim 10 wherein said aldehyde is a lower aliphatic aldehyde.

12. A process for the preparation of a porous foamed plastic composition according to claim 10 wherein said aldehyde is formaldehyde.

13. A process for the preparation of a porous foamed plastic composition according to claim 10 wherein said polyamine of said carbamate is an alkylenepolyamine of up to about 6 carbon atoms, an alkylene-bis-aminoalkoxy ether of up to about 4 carbon atoms in said alkylene and in said aminoalkoxy groups, a piperazine, or a salt thereof.

14. A process for the preparation of a porous foamed plastic composition according to claim 10 wherein said polyamine of said carbamate is an ethylenediamine, a propylenediamine, a butylenediamine, a hexamethylenediamine, an ethylene-glycol-bis-aminopropyl ether, piperazine, or an acetate salt thereof.

15. A process for the preparation of a porous foamed plasitc composition according to claim 10 wherein said reactive addition polymer (1) is a copolymer of (a) a vinyl ester or an allyl ester of an acid of the formula

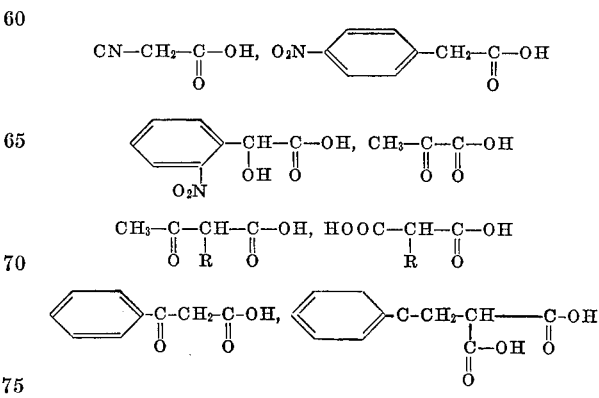

or

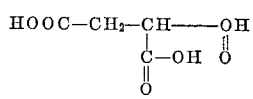

wherein R is a hydrogen atom or a lower alkyl group, and (b) vinyl acetate, vinyl isobutyrate, styrene, methyl acrylate, methylmethacrylate, ethylene, or vinyl chloride.

16. A process for the preparation of a porous foamed plastic composition according to claim 10 wherein said reactive addition polymer (1) is a copolymer of vinyl acetate and allyl acetoacetate.

17. A process for the preparation of a porous foamed plastic composition according to claim 10 wherein a liquefied halogen-substituted alkane, an alkane of 5 to 6 carbon atoms or a lower alkylene ether is added to the components (1), (2) and (3) as an expanding agent during the reaction.

References Cited

UNITED STATES PATENTS

| 2,475,273 | 7/1949 | Adelson et al. | 260—63 |
| 2,480,810 | 8/1949 | Jones | 260—65 |
| 2,566,255 | 8/1951 | Smith et al. | 260—851 |
| 2,755,268 | 7/1956 | Uelzmann | 260—64 |
| 3,236,913 | 2/1966 | Pfeiffer et al. | 260—851 |
| 3,275,587 | 9/1966 | Weller et al. | 260—29.2 |
| 3,311,575 | 3/1967 | Graham | 260—2.5 |

OTHER REFERENCES

"Modern Plastics Encyclopedia for 1964," vol. 41, No. IA, September 1963, pp. 364–370.

MURRAY TILLMAN, *Primary Examiner.*

J. C. BLEUTGE, *Assistant Examiner.*